July 30, 1968  P. D. ANDREWS ET AL  3,394,534
BAG FILTER

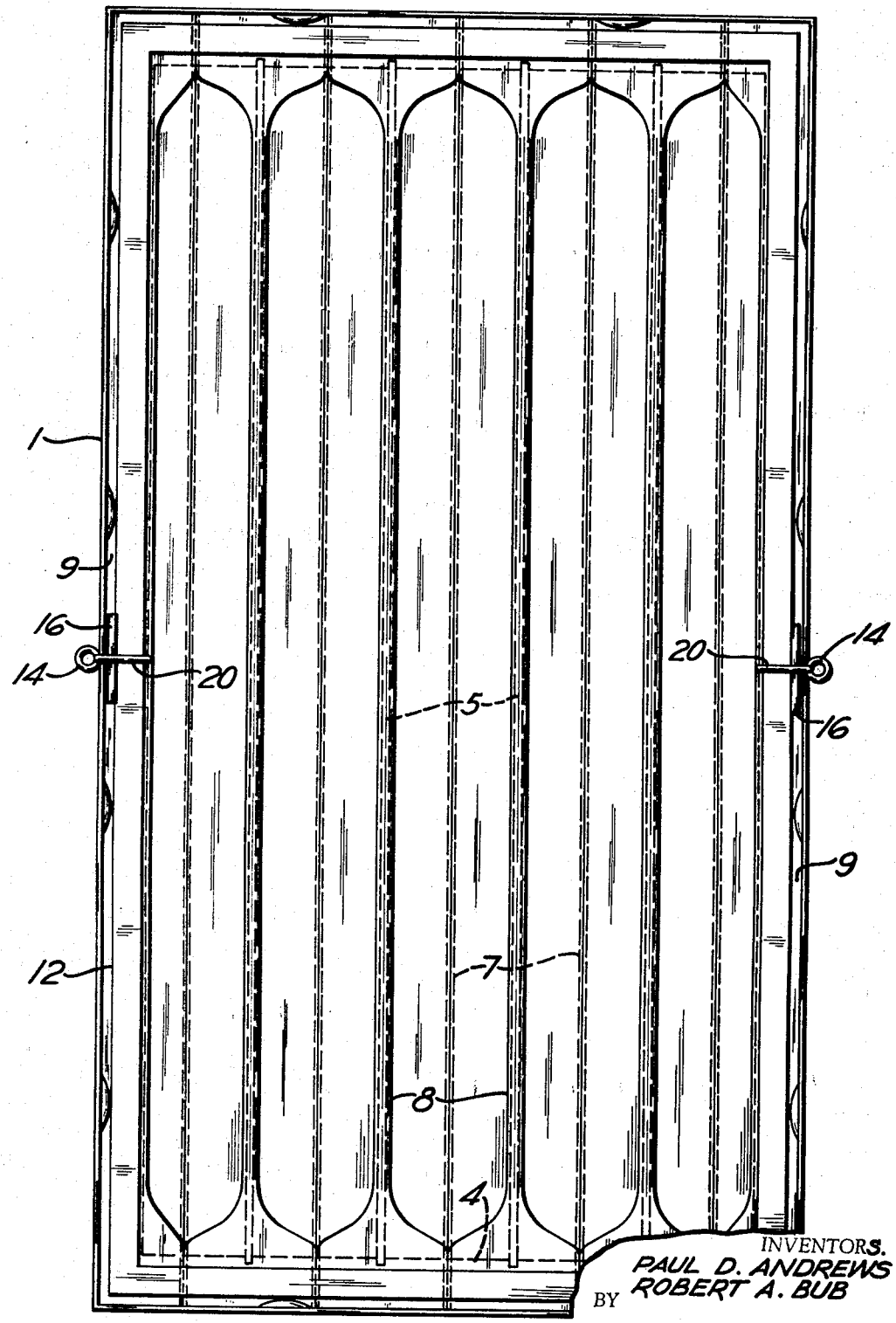

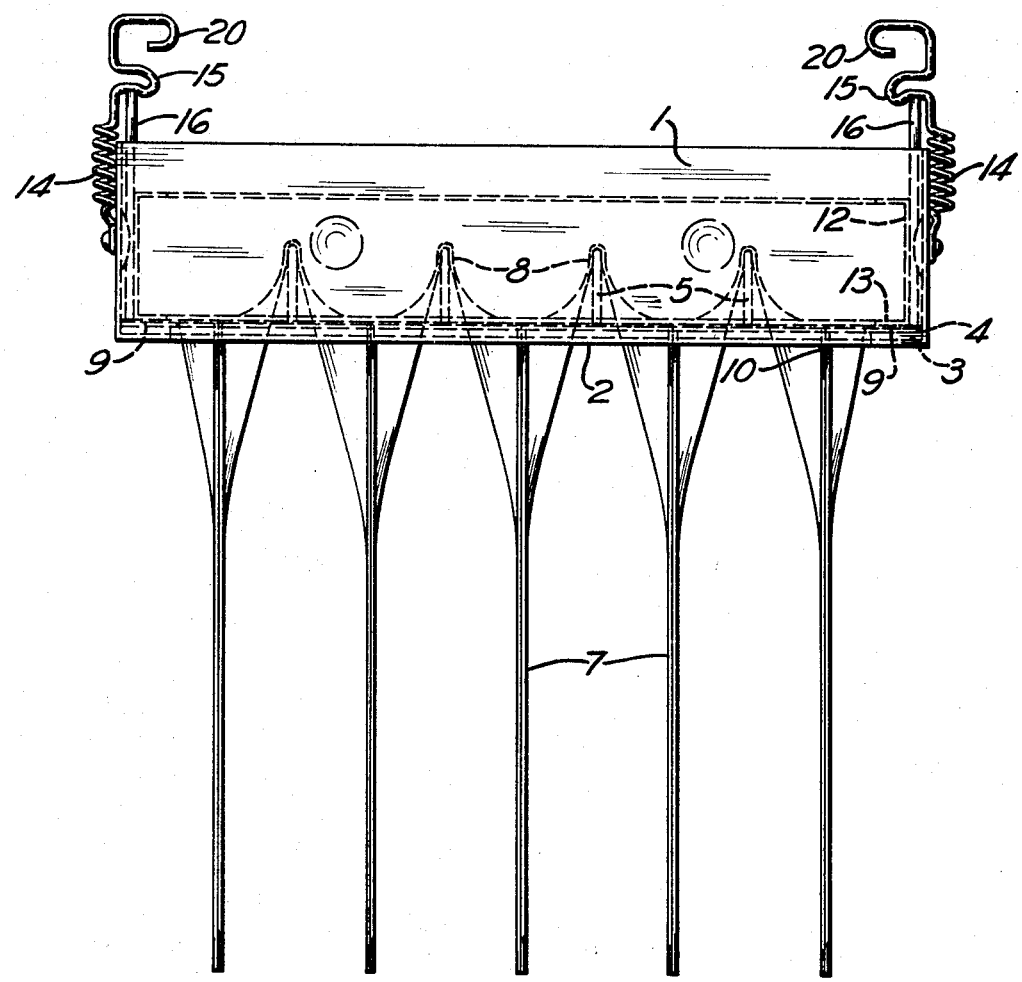
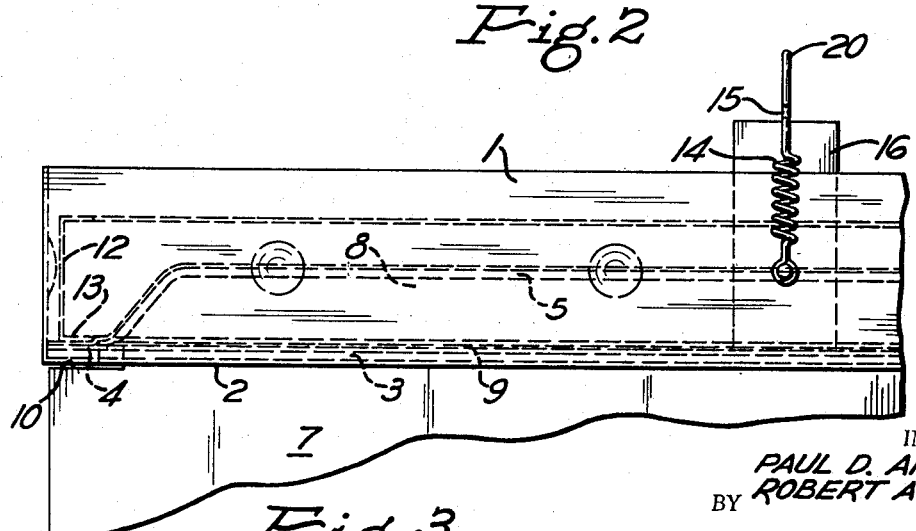

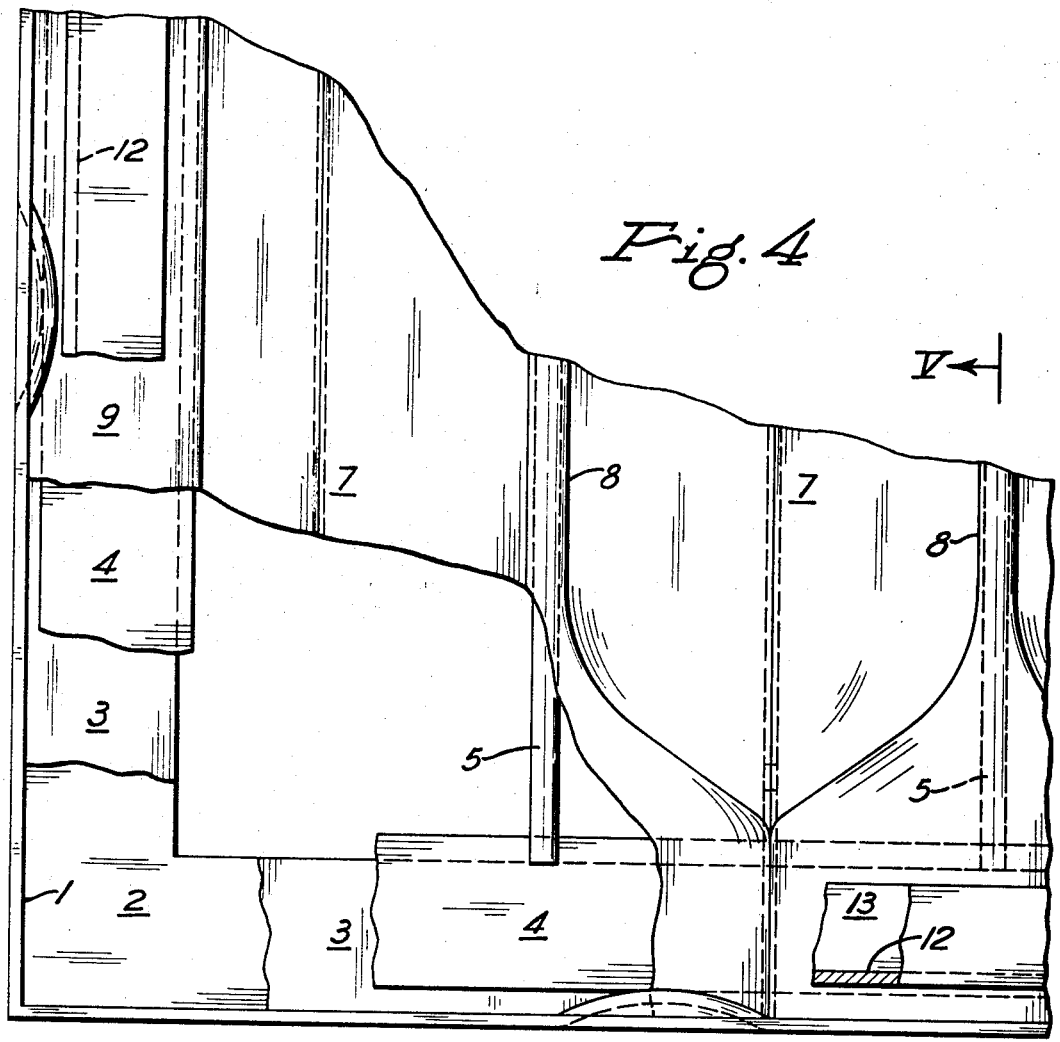
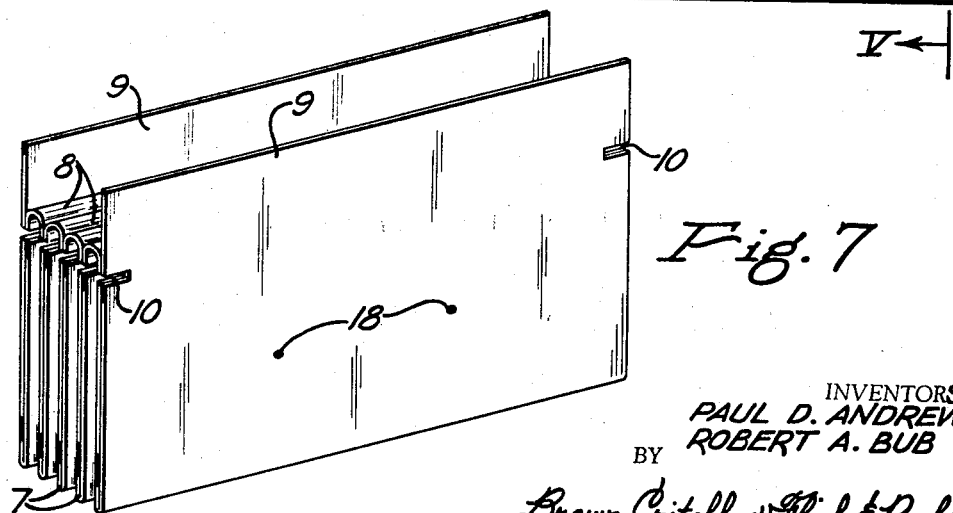

Filed Jan. 26, 1967  4 Sheets-Sheet 4

INVENTORS.
PAUL D. ANDREWS
BY ROBERT A. BUB

Brown, Critchlow, Flick & Peckham
ATTORNEYS.

3,394,534
BAG FILTER

Paul D. Andrews, Dormont, and Robert A. Bub, Gibsonia, Pa., assignors to Mine Safety Appliances Company, Pittsburgh, Pa., a corporation of Pennsylvania
Filed Jan. 26, 1967, Ser. No. 611,919
6 Claims. (Cl. 55—484)

ABSTRACT OF THE DISCLOSURE

A rectangular grille is provided with a framelike ledge supporting the opposite ends of spaced parallel cross members. A group of filter bags disposed side by side, with their open ends connected to one another by webs, extend between the cross members which support the webs. The opposite side edges of each bag are provided with a pair of lateral notches beside the open ends of the bags for receiving two opposite sides of the ledge. A clamping ring holds the end portions of the webs flat against the ledge.

---

It is among the objects of this invention to provide a bag filter which is simple and inexpensive in construction, in which the bags are provided with their own continuous sealing flange, and in which the filter bags can be quickly inserted and also quickly removed and replaced.

Figure 5:
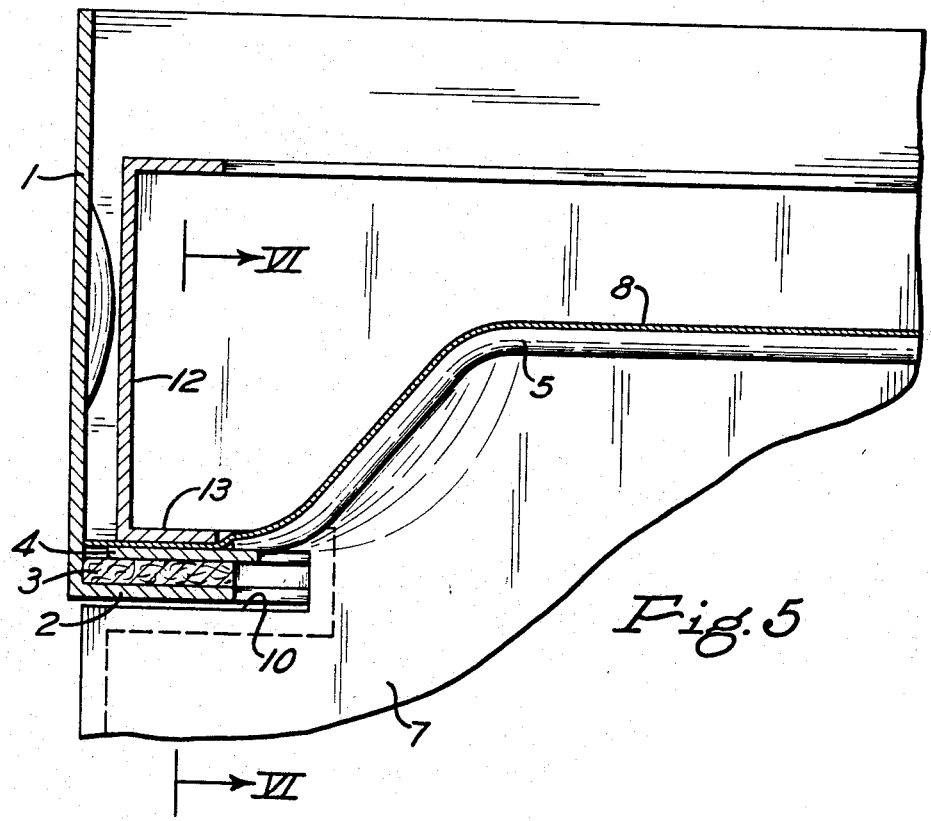
Figure 6:
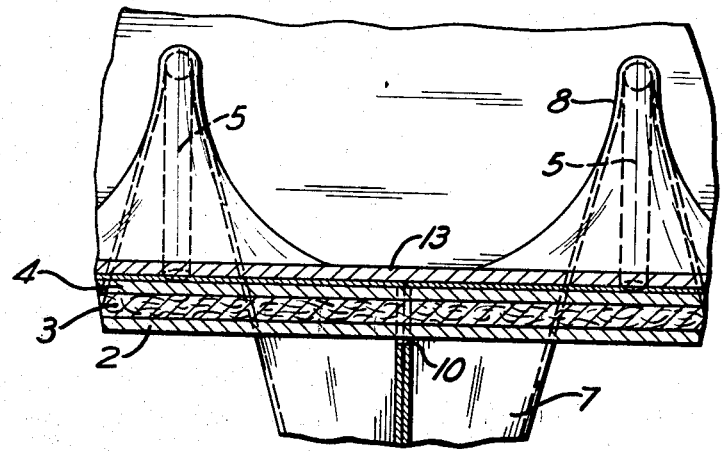

The preferred embodiment of the invention is illustrated in the accompanying drawings, in which FIG. 1 is a plan view;
FIG. 2 is a side view;
FIG. 3 is a fragmentary side view showing the filter turned 90 degrees from its position in FIG. 2;
FIG. 4 is an enlarged fragmentary plan view of a corner portion of the filter, with various superimposed parts broken away;
FIG. 5 is a vertical section taken on the line V—V of FIG. 4;
FIG. 6 is a vertical section taken on the line VI—VI of FIG. 5; and
FIG. 7 is a reduced perspective view of the filter element before insertion in the grille.

Referring to the drawings, an inexpensive frame-like rectangular housing 1 made of a strip of sheet metal has an inturned lower edge portion forming a horizontal flange 2 around the interior of the housing. Preferably, a gasket 3 is seated upon this flange. Resting on the gasket is a flat rectangular frame 4, across which a plurality of uniformly spaced parallel cross members 5 extend. These members most suitably are rods, the ends of which are welded to the inner edge portion of the frame. For best results, the end portions of each rod are inclined inwardly and upwardly a short distance from the frame and are connected by the main horizontal body of the rod, as shown in FIGS. 3 and 5. In other words, the main portions of the rods lie in a plane above the plane of the frame for a purpose that will be explained later. The frame 4, gasket 3 and flange 2 form a ledge around the inside of housing 1, and the assembly of elements thus far described for a rectangular grille.

The novel filter element itself consists of a group of bags 7 disposed side by side, but spaced apart. As shown in FIG. 7, the bags are formed by taking a long strip of suitable filtering material and folding it back and forth upon itself in zigzag fashion. The adjoining edges of alternate pairs of the folds are the sealed together in any suitable manner to form bags that are open only at their upper ends to provide their inlets. A couple of inches or so of material is left between the upper ends of adjoining bags to form connecting webs 8. Also, some material is left at both ends of the group of bags to form end flaps 9. Close to the open end of each bag its opposite side edges are provided with a pair of lateral notches 10. These notches may be formed by merely slitting the bags inwardly for a short distance or by actually cutting out a small amount of material. In either case, the side walls of the bag around the notches are sealed together. It will be seen that the end portions of the connecting webs 8 extend between adjoining notches.

The filter element is picked up by its end flaps 9, it is expanded and the bags are lowered between cross rods 5 until the connecting webs 8 rest on the rods to support the bags. Of course, there is only one bag between each adjoining pair of rods, over which the filtering material is draped. This insertion of the bags in the frame may be done before frame 4 is placed in the housing or after that has occurred. The end flaps of the group of bags will overlie the two adjoining sides of the frame, while the remaining two sides of the frame will extend into the notches in the side edges of the bags. This means that the end portions of webs 8 will overlie two sides of the frame and can be flattened out on it. The sealed upper edges of notches 10 will prevent gaps from appearing between adjoining webs above the notches.

To clamp and seal the filter element in place, a rectangular retaining ring 12 is inserted in the housing. This ring is formed from a sheet metal channel having a lower flange 13 resting on the end flaps of the filter element and on the end portions of the connecting webs 8. When the retaining ring is pressed down, it presses the frame-engaging marginal area or flange of the filter lement flat against the frame all around the element and thereby forms a seal. This sealing flange of the filter element is, of course, integral with it and is continuous with no breaks. To press the retaining ring against it, springs are used.

A suitable way of employing springs is to fasten the lower ends of coil springs 14 to opposite sides of housing 1 and bend their upper portions to form inwardly projecting hooks 15. These hooks, after the springs have been stretched, are hooked over the upper ends of rigid platelike lugs 16 secured to the retaining ring and projecting up above the surrounding housing. The tension on the spring pulls the retaining ring and housing flange 2 toward each other to hold all of the parts tightly together. By unhooking the springs from the lugs, the retaining ring can be lifted out of the housing and then the bags can be removed when necessary and replaced by clean bags.

The reason for having cross rods 5 project above frame 4 is to make sure that the upper ends of the bags will always stay open. By lifting the webs 8 up above the level of the frame, which also is the level of the bag openings, the upper portions of the side walls of each bag are held apart. On the other hand, about half way down in each bag its side walls may be fastened together at one or more spots 18 by any suitable means to prevent the bags from ballooning too much and engaging one another while air is passing through them.

If desired, a prefilter (not shown) can be employed by inserting it in the retaining ring and holding it down, depending on the thickness of the prefilter, by means of spring hooks 15 or by additional hooks 20 formed above them.

The filter bags are inserted and removed from the upstream end of the housing 1 in the arrangement shown and described herein, but it will be realized that by a simple rearrangement of the parts the bags can be inserted and removed from the downstream end. All that needs to be done is to invert housing 1 and retaining ring 12 as a unit so that retaining ring flange 13 will engage the bottom of frame 4, and gasket 3 will press against the top of the marginal portion of the filter element engaging the top of the frame. Members 4, 5 and 12 will then be the rectangular grille, and member 1 will be the clamping ring.

It will also be realized that frame 4 can be omitted and cross rods 5 fastened directly to flange 2 of housing 1 in FIG. 5, if desired. The use of the frame, however, has the advantage that the bags can be hung over the cross rods before being inserted in the housing.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A bag filter comprising a rectangular grille provided with a frame-like ledge rigidly supporting the opposite ends of a plurality of spaced parallel cross members, a group of flexible filter bags disposed side by side with their open ends integrally connected to one another by webs, there being integral flaps at the opposite ends of said group, the bags extending between said cross members with said webs supported thereby and with said flaps overlying two opposite sides of said ledge, the opposite side edges of each bag being provided in the plane of the ledge with a pair of lateral notches beside the open end of the bag and receiving the other two sides of said ledge, the end portions of the webs lying flat against the ledge, and a clamping ring holding said flat end portions and flaps against the ledge.

2. A bag filter according to claim 1, including means for holding a prefilter in said clamping ring.

3. A bag filter according to claim 1, in which said grille comprises a rectangular housing provided with an inwardly projecting flange around its interior, and a rectangular frame supporting said cross members and disposed in said housing and overlapping said flange, said flange and frame forming said ledge.

4. A bag filter according to claim 1, including springs permanently fastened to opposite sides of the grille and provided with hooks at their free ends and lugs secured to said ring and projecting upstream therefrom with said hooks hooked over their outer ends to pull the ring toward the ledge.

5. A bag filter according to claim 1, in which said bags are formed from a single strip of filtering material with the side walls of each bag sealed together along the edges of the strip and around said notches.

6. A filter element consisting of a group of filter bags disposed side by side with their open ends integrally connected to one another by webs adapted to be supported by a grille, there being integral flaps at the opposite ends of the group, the opposite side edges of each bag being provided with a pair of lateral notches beside the open end of the bag, all of the notches being in the same plane and the edges of the notches being sealed, and the end portions of the webs extending between the notches.

References Cited

UNITED STATES PATENTS

| | | | |
|---|---|---|---|
| 540,856 | 6/1895 | Dodge | 55—341 |
| 1,958,735 | 5/1934 | Worthington | 55—503 |
| 2,387,303 | 10/1945 | Sebok | 55 |
| 2,771,155 | 11/1956 | Palmore | 55 |
| 2,907,406 | 10/1959 | Baden et al. | 55—509 |
| 2,945,559 | 7/1960 | Buckman | 55—521 |
| 3,249,228 | 5/1966 | Arvantikis | 55—500 |
| 3,273,321 | 9/1966 | Bauder et al. | 55—341 |

FOREIGN PATENTS

| | | |
|---|---|---|
| 905,113 | 9/1962 | Great Britain. |

HARRY B. THORNTON, *Primary Examiner.*

B. NOZICK, *Assistant Examiner.*